W. DE ROOY.
PNEUMATIC TIRE.
APPLICATION FILED SEPT. 10, 1918.
1,303,865.
Patented May 20, 1919.
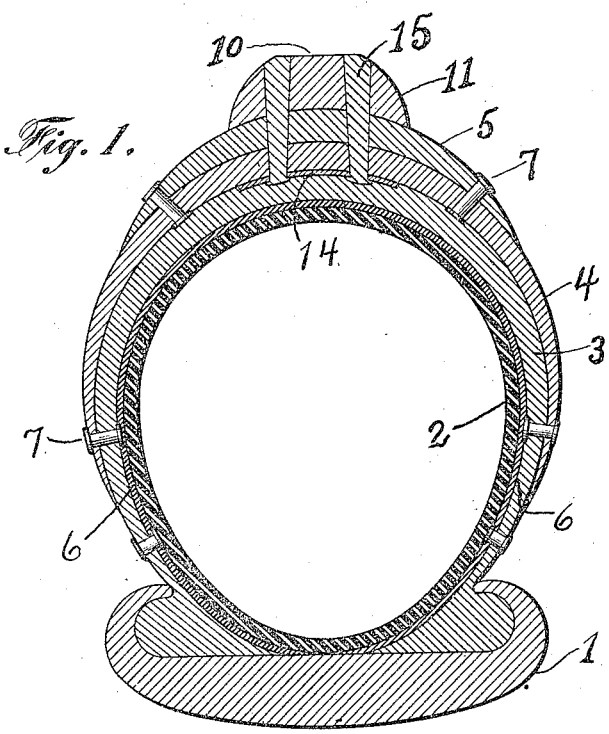
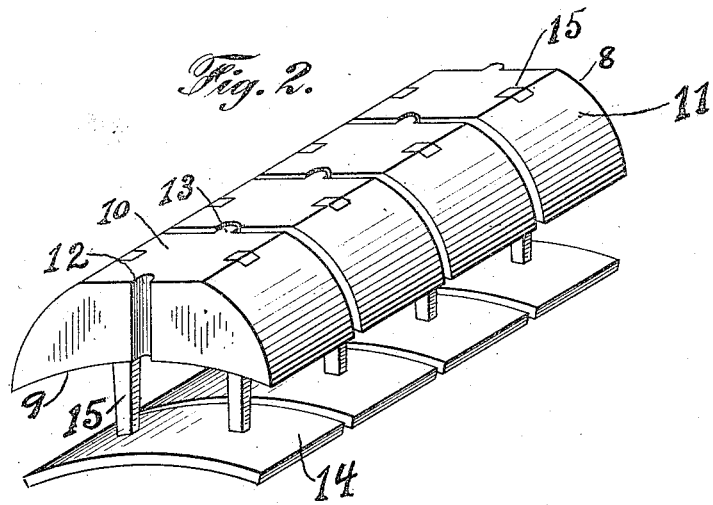
INVENTOR
William de Rooy
BY James H. Griffin
ATTORNEY

UNITED STATES PATENT OFFICE.

WILLIAM DE ROOY, OF NEW YORK, N. Y.

PNEUMATIC TIRE.

1,303,865.              Specification of Letters Patent.     Patented May 20, 1919.

Application filed September 10, 1918. Serial No. 253,383.

*To all whom it may concern:*

Be it known that I, WILLIAM DE ROOY, a subject of the Queen of Holland, now residing in the city of New York, borough of Manhattan, county and State of New York, have invented a certain new and useful Pneumatic Tire, of which the following is a specification.

This invention is a pneumatic tire, and, speaking generally, the objects of the invention are to produce a tire of pronounced durability without employing the customary rubber shoe, and to produce a tire having a novel and efficient non-skid tread integrally secured to the shoe.

With the foregoing objects in view, the shoe or casing of the tire is composed of a plurality of plies of leather, secured together in any suitable way, as by rivets, and the tread surface of the tire embodies a plurality of metallic members, preferably of steel, provided with coöperating tongues and grooves whereby they are locked against lateral displacement, but permit of the necessary circumferential movement, somewhat in the nature of links. Each tread member coöperates with an individual metallic attaching plate, positioned between the plies of leather, the tread members and attaching plates being secured together by tapering pins, which are upset at their inner ends against the inner faces of the attaching plates.

Features of the invention other than those specified, will be apparent from the hereinafter detailed description taken in conjunction with the accompanying drawings.

In the accompanying drawings, I have illustrated one practical form of the invention, but the construction shown therein is to be understood as illustrative, only, and not as defining the limits of the invention.

Figure 1 is a transverse section through the tire, showing the securing rivets in elevation; and Fig. 2 is a fragmentary perspective view of the tread members, attaching plates and securing pins.

Referring to the drawings, 1 designates the rim of the wheel, 2 the pneumatic inner tube, 3 the inner ply of leather, 4 the intermediate ply of leather and 5 the exterior ply of leather. Positioned intermediate of the inner ply of leather and pneumatic tube 2 is a layer of canvas 6. The plies or layers of leather are preferably assembled in the particular lapped relation shown in Fig. 1, from which it will be noted that the inner ply 3 substantially encircles the inner tube, whereas the outer ply 5 is of considerable less width and the middle ply 4 of intermediate width. The plies of leather are secured together by rivets 7, some of the rivets extending through the outer and intermediate plies of leather, others through the intermediate and inner plies of leather and those near the rim of the wheel through the inner ply 3 and canvas 6.

The attaching members 8 are preferably of the shape shown in Fig. 2, the inner faces 9 thereof being curved to conform to the configuration of the tire, the tread 10 being preferably flat, with curved sides 11 connecting the outer and inner faces. Each tread member is provided with a groove 12 and a tongue 13, the tongue of one member coöperating with the groove in the adjacent member, whereby the members are locked against lateral movement but have a certain amount of play or flexibility circumferentially of the tire.

Positioned between the inner and intermediate plies of leather are attaching plates 14, and the tread members are attached thereto by tapering pins 15 which are upset at their inner ends against the inner faces of the attaching plates as clearly appears in Fig. 1.

A tire of the construction described can be manufactured at a relatively small cost and is of great durability, not only because of the non-skidding tread members but by reason of the different plies of leather which are successively worn away, after the tread members have worn off.

It will be understood that mechanical and formal changes may be made in the structure described, such as the substitution of equivalents, without departing from the spirit or substance of the invention, the scope of which is commensurate with the appended claims; *e. g.*, one of the inner plies might be composed of rubber or other suitable material. As shown in Fig. 1, the edges of the outer plies are skived which edges are preferably cemented to the subjacent ply. Moreover, it is usually desirable to treat the leather plies in one well known way or another to render them water proof.

Having described the invention, what I claim is:

1. As a new article of manufacture, a pneumatic tire embodying an inner rubber tube, a plurality of plies of leather exteriorly thereof, the successive plies being of progressively lesser width from the inside outwardly of the tire, and rivets for securing the lateral edge of each ply through the preceding ply in combination with interfitting metallic tread members positioned circumferentially of the tire, attaching plates interposed between the plies of tire, and tie members between the plates and the interfitting tread members for holding the latter in position circumferentially of the tire.

2. As a new article of manufacture, a pneumatic tire embodying a plurality of plies of leather, metallic plates interposed between the plies, interfitting metallic tread members positioned circumferentially of the tire, and means connecting the metallic tread members to the plates for holding said tread members in position circumferentially of the tire.

In testimony whereof, I have signed my name to this specification.

WILLIAM DE ROOY.